US012688393B2

(12) United States Patent
Giudici et al.

(10) Patent No.: US 12,688,393 B2
(45) Date of Patent: Jul. 21, 2026

(54) RING OR JEWEL ASSEMBLY WITH RADIO FREQUENCY TRANSCEIVER AND/OR RADIO FREQUENCY REMOTE CONTROL FUNCTION

(71) Applicants: Sergio Giudici, Ponte Lambro (IT);
Gianluca Mosca, Sovico (IT)

(72) Inventors: Sergio Giudici, Ponte Lambro (IT);
Gianluca Mosca, Sovico (IT)

( * ) Notice: Subject to any disclaimer, the term of this patent is extended or adjusted under 35 U.S.C. 154(b) by 378 days.

(21) Appl. No.: 18/249,963

(22) PCT Filed: Oct. 20, 2021

(86) PCT No.: PCT/IB2021/059681
§ 371 (c)(1),
(2) Date: Apr. 20, 2023

(87) PCT Pub. No.: WO2022/084886
PCT Pub. Date: Apr. 28, 2022

(65) Prior Publication Data
US 2023/0394273 A1 Dec. 7, 2023

(30) Foreign Application Priority Data

| Oct. 22, 2020 | (IT) | ......................... | 102020000024997 |
| Oct. 22, 2020 | (IT) | ......................... | 202020000005923 |
| May 4, 2021 | (IT) | ......................... | 102021000011324 |

(51) Int. Cl.
| *G06K 19/077* | (2006.01) |
| *A44C 9/00* | (2006.01) |
| *G06K 7/10* | (2006.01) |

(52) U.S. Cl.
CPC ...... *G06K 19/07762* (2013.01); *A44C 9/0053* (2013.01); *G06K 7/10168* (2013.01); *G06K 19/07771* (2013.01)

(58) Field of Classification Search
None
See application file for complete search history.

(56) References Cited

U.S. PATENT DOCUMENTS

| 10,509,994 | B1 | 12/2019 | Huynh | |
| 2007/0279241 | A1 | 12/2007 | Jung | |
| 2014/0292477 | A1* | 10/2014 | Ahmadloo | ......... G06K 7/10168 340/5.8 |

OTHER PUBLICATIONS

International Search Report and Written Opinion received for PCT Serial No. PCT/IB2021/059681, on Feb. 14, 2022, 10 pgs.

* cited by examiner

*Primary Examiner* — Kristy A Haupt
(74) *Attorney, Agent, or Firm* — Merchant & Gould P.C.

(57) ABSTRACT

A ring or jewel assembly has a radio frequency transceiver function. The assembly includes a metal body of the ring or jewel; a cavity in the body, filled, at least in part, by portions with dielectric material; and a radio frequency transceiver microelectronic device. The transceiver microelectronic device transmits and receives radio frequency signals SRF, with a spectrum belonging to a predetermined radio frequency range and is fixed to the body, at least partially inserted in the cavity and at least partially surrounded by the dielectric material. The dielectric material is interposed between the metal body and the transceiver microelectronic device, to prevent the transceiver microelectronic device from being in contact with the metal of the ring or jewel, and to form a space of dielectric material, adapted to allow propagation of electromagnetic signals SRF having a spectrum in the radio frequency range.

15 Claims, 4 Drawing Sheets

RING OR JEWEL ASSEMBLY WITH RADIO FREQUENCY TRANSCEIVER AND/OR RADIO FREQUENCY REMOTE CONTROL FUNCTION

CROSS REFERENCE TO RELATED APPLICATIONS

This application is a National Stage Application of PCT/IB2021/059681, filed Oct. 20, 2021, which claims benefit of Serial No. 10 2020 000024997, filed Oct. 22, 2020, in Italy, Serial No. 20 2020 000005923, filed Oct. 22, 2020, in Italy, and Serial No. 10 2021 000011324, filed May 4, 2021, in Italy and which applications are incorporated herein by reference. To the extent appropriate, a claim of priority is made to each of the above disclosed applications.

FIELD OF APPLICATION

The present invention relates to a ring or jewel assembly with radio frequency transceiver and/or radio frequency remote control function.

PRIOR ART

Many systems and methods are known to provide effective low-cost remote controls and/or radio frequency transceivers and/or RFID tags or transponders which can be used for multiple purposes.

Conversely, there are no known systems or methods for integrating such remote controls or radio frequency transceivers and/or RFID tags or transponders into objects which can be used or worn by a user, such as to confer convenience of use and security benefits.

In particular, there are no known systems or methods for integrating such remote controls or radio frequency transceivers and/or RFID tags or transponders into rings or jewels, e.g., made of gold or precious metals.

Indeed, a currently unsolved technical problem, which precludes the above solutions, is that the ring or jewel is made primarily of gold or other precious metal, i.e., of a conducting material that, as is well known, has the effect of shielding electromagnetic waves generated near it, drastically attenuating or even canceling such electromagnetic waves in the surrounding space, and not allowing them to propagate outward.

Therefore, the need is felt for systems or methods which make it possible to integrate such radio frequency remote controls or transceivers and/or RFID tags or transponders in rings or jewels, to ensure easy and effective use, and which also allow for high levels of security relative to the radio signal interception and duplication.

In particular, such a need is felt in the area of car remote controls, for example.

Indeed, in the jewelry field, on one hand, and in the field of high-end cars, on the other, until now, rings made of precious (or even non-precious) metals, which allow a connection and multiple functions with cars through the exchange of radio frequency wireless signals, have never been made.

SUMMARY OF THE INVENTION

It is the object of the present invention to provide a ring or jewel assembly with radio frequency transceiver and/or radio frequency remote control which makes it possible to solve, at least in part, the drawbacks described above with reference to the prior art and to respond to the aforesaid needs particularly felt in the considered technical sector.

BRIEF DESCRIPTION OF THE DRAWINGS

Further features and advantages of the method according to the invention will be apparent in the following description which illustrates preferred embodiments, given by way of indicative, non-limiting examples, with reference to the accompanying figures, in which.

Figure 1:
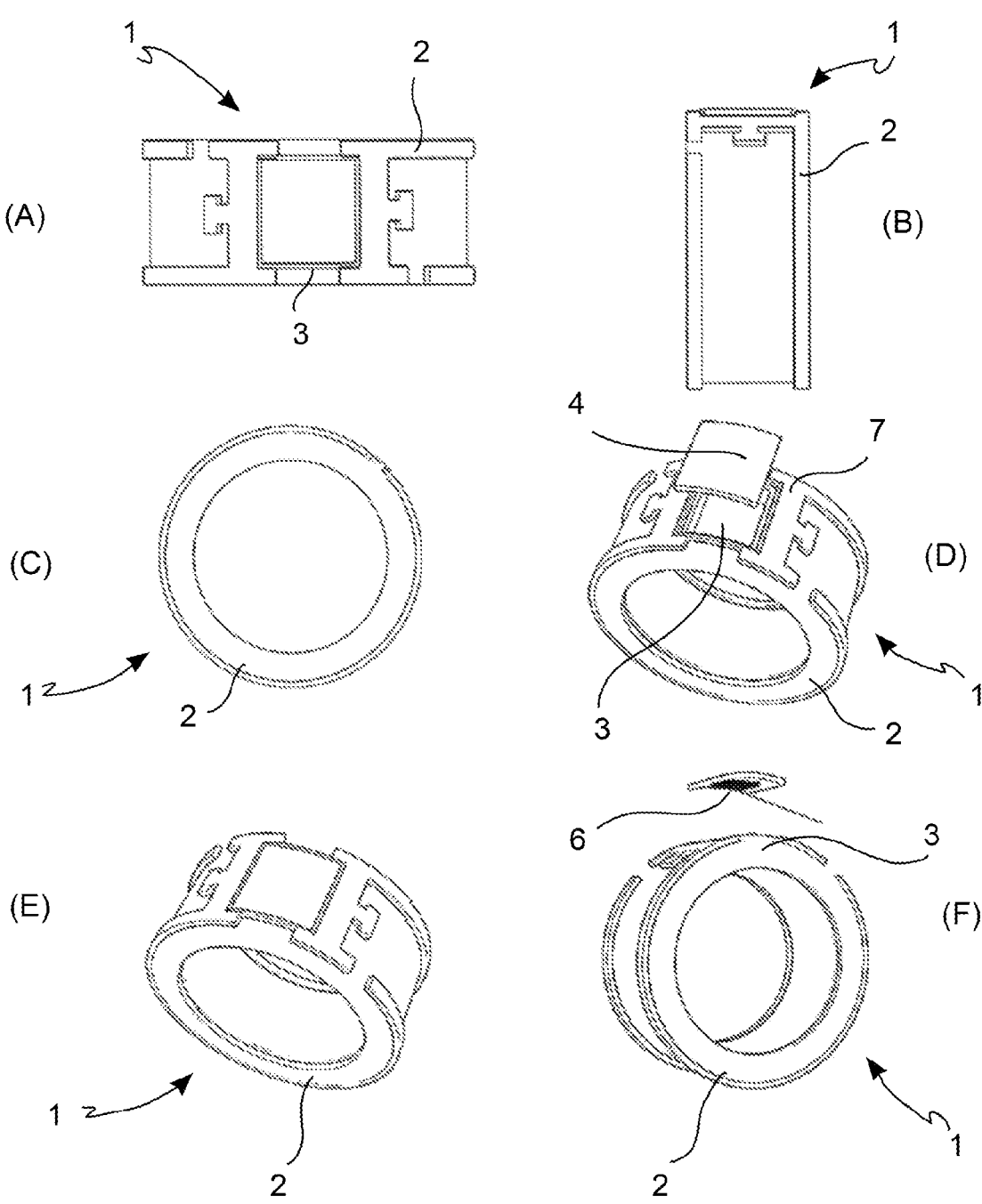
FIG. 1 shows an embodiment of a ring assembly according to the present invention; in particular, figures from 1A to 1F show a top view, a first side view, a second side view, a first partially exploded perspective view, a perspective view, and a second partially exploded perspective view of the ring assembly according to this embodiment.
Figure 2:
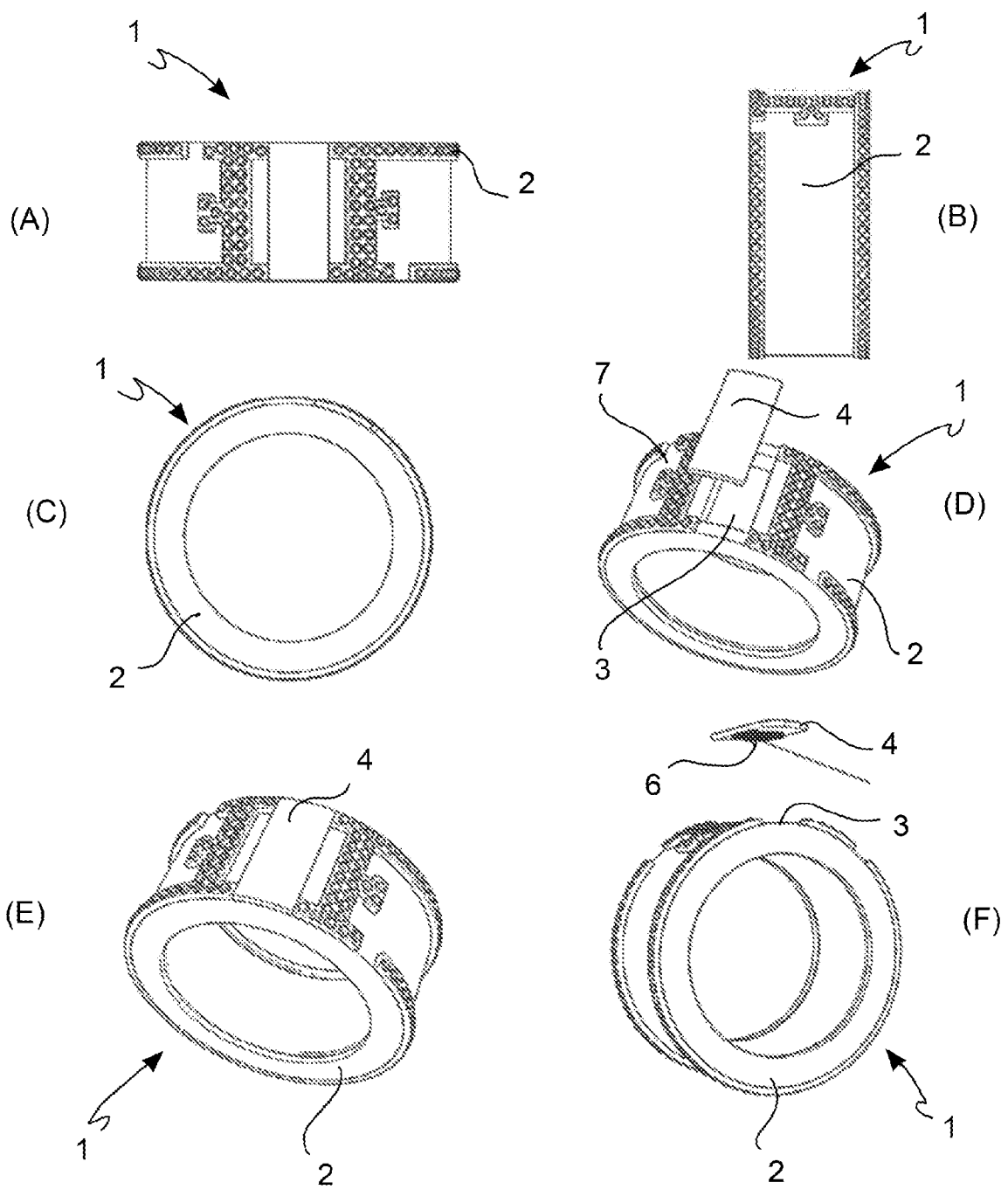
FIG. 2 shows another embodiment of a ring assembly according to the present invention.
Figure 3:
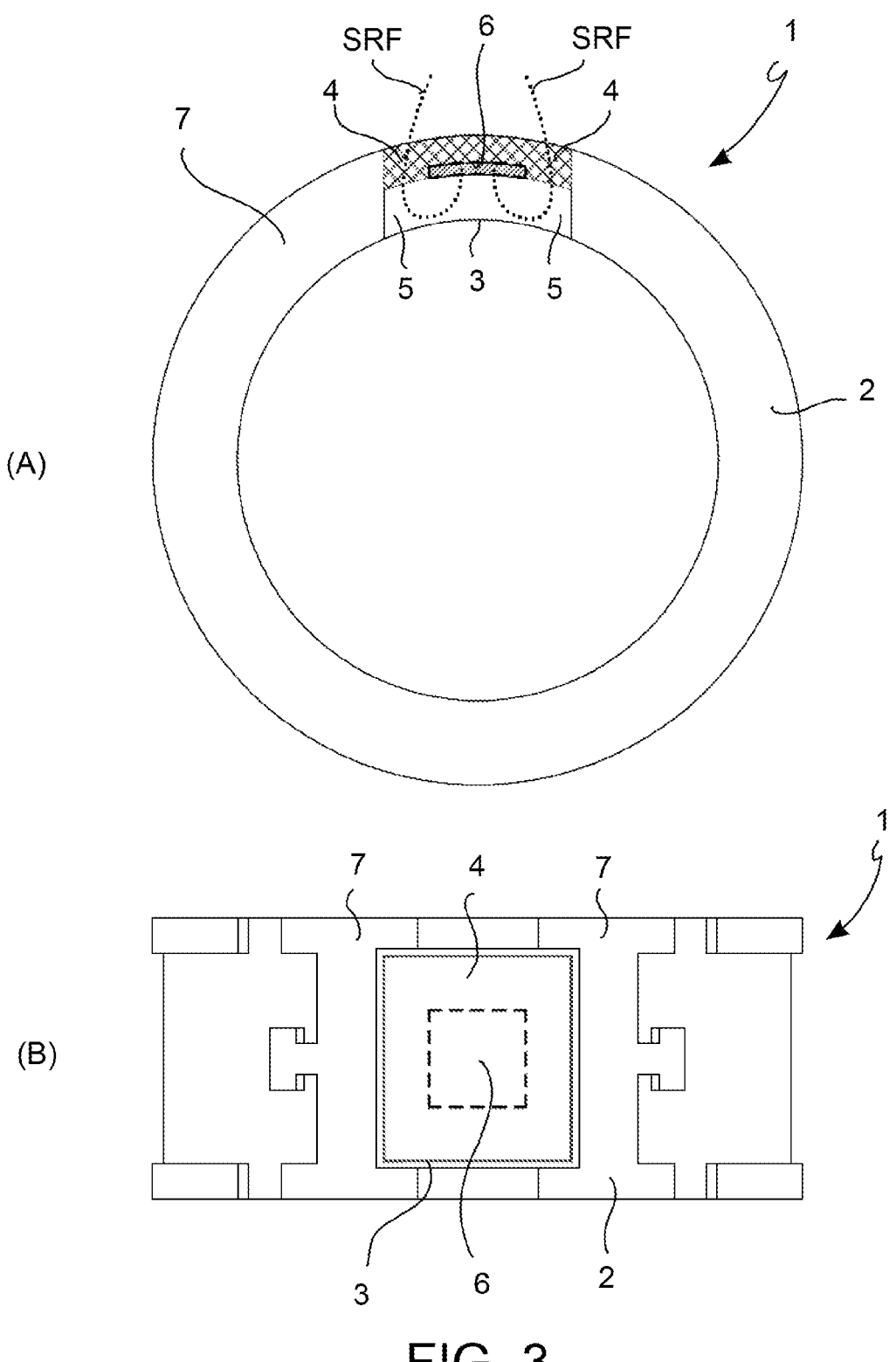
Figure 4:
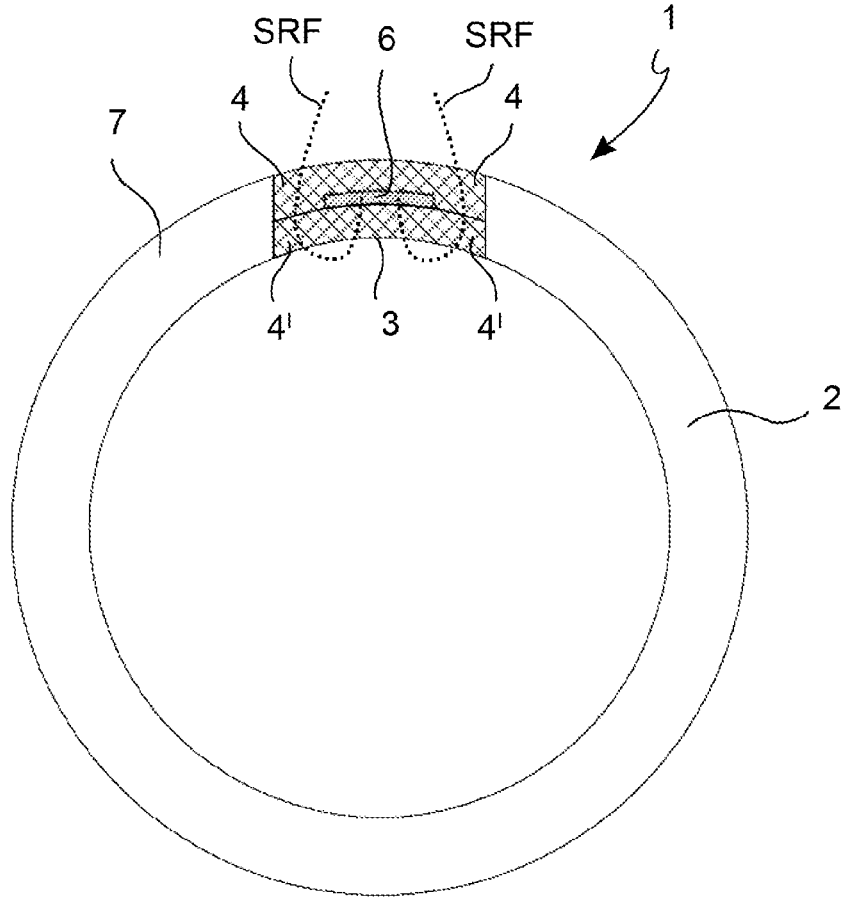

in particular, figures from 2A to 2F show a top view, a first side view, a second side view, a first partially exploded perspective view, a perspective view, and a second partially exploded perspective view of the ring assembly according to this other embodiment;

FIGS. 3A and 3B show a cross-section side view and a top view, respectively, of an embodiment of a ring assembly according to the present invention;

FIG. 4 shows a side section view of a further embodiment of a ring assembly according to the present invention.

DETAILED DESCRIPTION

A ring or jewel assembly with radio frequency transceiver function 1 is described with particular reference to FIGS. 1-4.

Such an assembly 1 comprises a body of the ring or jewel 2 made of metal, a cavity 3 obtained in the aforesaid body of the ring or jewel 2, filled, at least in part, with one or more portions 4, 5 consisting of at least one dielectric material, and a radio frequency transceiver microelectronic device 6.

The radio frequency transceiver microelectronic device 6 is configured to transmit and receive radio frequency signals SRF, with a spectrum belonging to a predetermined radio frequency range and is fixed to the ring or jewel 2, at least partially inserted the aforesaid cavity 3, and at least partially surrounded by said at least one dielectric material.

The at least one dielectric material is interposed between the metal 7 of the body of the ring or jewel 2 and the radio frequency transceiver microelectronic device 6, so as to prevent the radio frequency transceiver microelectronic device 6 from being in contact with the metal 7 of the ring or jewel, and to form a space of dielectric material, adapted to allow the propagation of electromagnetic signals having a spectrum in said radio frequency range.

According to an embodiment, the size of such a space of dielectric material and the dielectric properties of the one or more dielectric materials used are such as to cancel or significantly reduce the shielding effect of the radio frequency electromagnetic waves by the metal of the body of the ring or jewel, and therefore allow the propagation, in such a space of dielectric material, of electromagnetic waves having a spectrum in such a radio frequency range used, and permit the propagation, in the space surrounding the ring, of the radio frequency electromagnetic signals SRF transmitted or intended to be received by the radio frequency transceiver microelectronic device 6.

In an implementation example, the relative dielectric constant of the dielectric material and the size of the dielectric material space are chosen according to the radio frequency range predetermined for use, and/or the expected electrical power of the microelectronic device, to create electromagnetic propagation conditions that are adapted to allow wave propagation at the desired frequencies of use.

The aforesaid structural and functional characteristics of the ring or jewel assembly avoid such electromagnetic signals from being totally or partially shielded by the metal of the ring or jewel body.

According to an embodiment, the microelectronic radio frequency transceiver device 6 is integral with the ring body and is fixed to a stone or to one of said dielectric material portions, which, in turn, are fixed to the ring body, and thus the microelectronic radio frequency transceiver device 6 is integral with the ring body.

According to an implementation option, the radio frequency transceiver microelectronic device 6 is fixed to the ring body by means of the aforesaid stone or portion of dielectric material.

According to an embodiment of the ring or jewel assembly 1, said ring or jewel is a precious metal ring containing at least one stone 4, for example, a precious stone 4, to which the microelectronic radio frequency transceiver device 6 is fixed.

The stone 4 is fixed to the ring body 2 and contained in the cavity 3 formed in the ring body 2, so that the cavity 3 remains partially filled only with air, thus constituting an air chamber 5 interposed between the microelectronic radio frequency transceiver device 6 and the body 2 of metal 7 of the ring 1.

The aforesaid portions of dielectric material comprise, in this case, two portions, a first portion 4 formed by a first dielectric material, i.e., stone, and a second portion 5 formed by a second dielectric material, i.e., air.

This embodiment is shown in FIGS. 3A and 3B.

In this case, for example, in the part underneath the stone, a recess is created in the metal, so as to avoid contact between the transceiver and the metal, and forming a sort of air chamber 5 necessary for the propagation of radio frequencies.

Also, in the precious stone 4 mounted above the recess 3 in the metal, a recess necessary for housing the microelectronic transceiver device 6 is made.

According to a particular implementation option, the size of the transceiver device 6 is in the order of millimeters, e.g., 3.2×3.2×0.5 mm.

According to other implementation options, the size of the transceiver device 6 may be different, up to a maximum of 12 mm.

According to a particular implementation option, the size of the cavity, and in particular of the aforementioned air chamber, is of the order of millimeters.

By way of non-limiting example only, the dimensions of a ring assembly, made with the structure of FIG. 3A, according to an implementation option, are indicated below: longitudinal size of the cavity 3 and of the stone 4 equal to 7.2 mm; thickness of the air chamber 5 equal to 2 mm; thickness of the stone 4 equal to 1.7 mm; thickness of the metal ring body 2 equal to 3.7 mm; distances between the edges of the microelectronic radio frequency transceiver device and the metal walls of the cavity equal to 2 mm.

According to another embodiment of the ring or jewel assembly 1, the aforesaid ring or jewel 1 is a precious metal ring containing two stone portions 4 and 4', for example, of a precious stone, to which the microelectronic radio frequency transceiver device 6 is fixed in an interlocking manner.

The stone portions 4 and 4' are fixed to the ring body 2 and contained in the aforementioned cavity 3 formed in the ring body 2.

In this case, the aforesaid two stone portions 4 and 4' form the two portions of dielectric material 4 and 4', consisting of a single dielectric material, i.e., stone.

Such embodiment is shown in FIG. 4.

By way of non-limiting example only, the dimensions of a ring assembly, made with the structure of FIG. 4, according to an implementation option, are indicated below: longitudinal size of the cavity 3 and stone 4 equal to 7.2 mm; thickness of the stone 4 equal to 1.7 mm; thickness of the stone 4' equal to 1.7 mm; thickness of the metal ring body 2 equal to 3.7 mm; distances between the edges of the microelectronic radio frequency transceiver device and the metal walls of the cavity equal to 2 mm.

According to various possible implementation options, the aforesaid stone 4 is a precious stone comprised in the ring or jewel, e.g., diamond, or emerald, or ruby, or onyx, and so on.

According to another embodiment of the ring or jewel assembly 1, the aforesaid ring or jewel is a precious metal ring containing two portions of carbon fiber between which the microelectronic radio frequency transceiver device is fixed in an interlocking manner.

This embodiment is not explicitly illustrated in the figures, because it is structurally entirely analogous to the structure of the ring assembly shown in FIG. 4, with the difference that the two precious stone portions are replaced by two carbon fiber portions.

The aforesaid carbon portions are fixed to the ring body 2 and contained in the cavity formed in the ring body.

In this case, the two carbon fiber portions form the two portions of dielectric material, consisting of a single dielectric material, i.e., carbon fiber.

According to another embodiment, the ring or jewel is a precious metal ring containing at least one carbon fiber portion to which the microelectronic radio frequency transceiver device is fixed. The aforesaid at least one carbon fiber portion is fixed to the ring body 2 and contained in the cavity formed in the ring body, so that the cavity remains partially filled only with air, constituting an air chamber interposed between the microelectronic radio frequency transceiver device and the body of the metal of the ring.

In this case, the aforesaid portions of dielectric material comprise two portions, a first portion formed by a first dielectric material, i.e., carbon fiber, and a second portion formed by a second dielectric material, i.e., air.

The above embodiment is not explicitly illustrated in the figures, as it is structurally entirely analogous to the structure of the ring assembly shown in FIG. 3A, with the difference that the precious stone portion is replaced by a carbon fiber portion.

According to an implementation example, carbon fiber is associated with an epoxy resin substrate.

According to an embodiment of the ring or jewel assembly 1, the size of the dielectric material space separating the microelectronic radio frequency transceiver device from the metal of the ring or jewel is comprised in the range from 2 mm to 5 mm.

According to an implementation option, the size of the dielectric material space is preferably comprised between 2 mm and 3 mm, and more preferably is 2 mm or 2.5 mm or 3 mm.

According to an embodiment of the ring or jewel assembly, the relative dielectric constant of said at least one dielectric material separating the microelectronic radio frequency transceiver device from the metal of the ring or jewel is less than 50.

According to possible implementation options, the relative dielectric constant of said at least one dielectric material separating the radio frequency transceiver microelectronic device from the metal of the ring or jewel and preferably less than 10 and preferably less than 5.

As previously noted, in principle, the size of the dielectric material space and the dielectric properties of the one or more dielectric materials employed can be chosen and designed as a function of the radio frequency range that is predetermined for use.

In practice, the Applicants have verified that for the entire range of radio frequencies of concern (e.g., LF or HF or UHF), the exemplary characteristics set forth above (dielectric space between 2 and 5 mm, air and/or precious stone or and/or carbon fiber chosen as dielectric materials) are such as to significantly reduce the shielding effect by the metal of the ring or jewel and allow for the desired propagation of electromagnetic signals in a space surrounding the jewel ring.

Indeed, from the point of view of dielectric properties, the aforesaid materials have relative dielectric constants comprised within the ranges mentioned above, both air (relative dielectric constant of about 1), diamond (typical relative dielectric constant between 5 and 10), other precious stones (such as emerald, ruby, onyx), and carbon fiber (which can be made with a dielectric constant belonging to the ranges mentioned above).

According to an implementation option, said cavity 3 is obtained by notching or engraving in the metal body 2 of the ring or jewel.

According to an implementation option, the aforesaid precious stone 4 is worked with a carving or inner boring to allow the passage of radio frequencies.

According to an embodiment of the ring or jewel assembly 1, the aforesaid precious metal is gold.

According to other embodiments of the ring or jewel assembly, the aforesaid precious metal is platinum, or titanium, or silver.

According to various possible embodiments, the ring or jewel assembly comprises a jewel or jewelry item other than a ring, provided that said jewel or jewelry item, or a part thereof intended to contain the transceiver device, has a size comparable to that mentioned above. The aforesaid detailed description of the ring assembly allows the expert in the field to easily transpose such a description to implement an embodiment with a jewel or jewelry item other than a ring.

According to an embodiment of the ring or jewel assembly 1, said microelectronic radio frequency transceiver device 6 is a passive transponder or tag, operating at a radio frequency.

According to an implementation option, such a radio frequency transceiver microelectronic 6 is a passive RFID transponder or tag, operating at RF-ID radio frequency.

According to an embodiment of the ring or jewel assembly 1, said microelectronic radio frequency transceiver device 6 is configured to operate at LF or HF or UHF frequencies.

According to specific possible implementation examples, the frequencies used are UHF 868 MHz and HF 13.56 MHz.

According to an embodiment of the ring or jewel assembly 1, the aforesaid passive transponder or tag is configured to interact with an external RF antenna, adapted to emit an activation signal, so that, when the ring or jewel assembly approaches said antenna below a predetermined operating distance, the transponder or tag is activated after receiving the activation signal.

The transponder or tag, once activated, is configured to emit one or more predetermined radio frequency signals corresponding to one or more predetermined commands.

According to an embodiment, the transponder or tag is configured to perform the functions of a remote control for an automobile, and is adapted to interoperate, in order to carry out one or more commands or functions, with one or more active RFID devices, arranged in respective positions within the automobile, each active RFID device comprising an RF antenna connected to a respective active RFID reader.

According to an implementation option, such an active RFID reader for communication is arranged on the car, for example by means of a dedicated CAN-BUS interface.

According to various possible embodiments comprised in the present invention, said one or more commands or functions comprise:

opening and closing the doors and trunk of the automobile; and/or automatically adjusting the driving settings of the driver, and/or starting and stopping the engine and/or changing the engine power and/or switching on and setting the air conditioning system, and/or switching on and managing the audio system.

According to an implementation option, the aforesaid one or more commands or functions are performed when the ring or jewel assembly approaches a respective active RFID device placed next to the handles, in case of opening and closing of the doors and trunk of the automobile.

According to an implementation option, the aforesaid one or more commands or functions are performed when the ring or jewel assembly approaches a respective active RFID device placed inside the passenger compartment, in case of other commands or functions above mentioned.

According to a further embodiment of the ring or jewel assembly, also comprised in the present invention, the transponder or tag is configured to the contactless operation functions of a credit or prepaid card.

Also in this case, such a use is based on RFID technology, and in particular provides a system which works via the tag placed inside the ring or jewel, that works like a tag of a credit card or prepaid card, and is configured to interact with appropriate tools, called readers, which are then able to read the information contained in the tag. The reading takes place through radio frequency, by virtue of which the apparatus can instantly receive the information from the tag it is querying (according to radio frequency communication technologies per se known, for example, short or medium range radio frequency communication).

According to an embodiment of the ring or jewel assembly, the aforesaid predetermined operating distance is of the order of a few centimeters, so that the commands and functions of the passive transponder or tag may be carried out only close to the aforesaid external antenna or the aforesaid active RFID device.

The passive transponder or tag is configured to allow the propagation of the radio frequency electromagnetic signal in a limited space outside the ring or jewel assembly of size comparable to those of the aforesaid predetermined operating distance.

According to an embodiment, the microelectronic radio frequency transceiver device thus belongs to the category of short-range wireless transceiver devices.

As can be seen, the objects of the present invention as previously indicated are fully achieved by the ring or jewel assembly described above by virtue of the features shown above in detail.

Indeed, the ring or jewel assembly described above makes it possible to integrate such radio frequency remote controls or transponders and/or RFID tags into rings or jewels, thus ensuring easy and effective use by the user, and also allowing for high levels of security relative to the radio signal interception and duplication.

It is also solved the technical problem determined by the shielding operated by the metal of the ring or jewel with respect to electromagnetic waves generated near it, or in recesses obtained in it, not allowing the outward propagation and precluding a wireless transceiver.

Indeed, as shown above, the ring or jewel assembly described above allows the propagation of radio frequency electromagnetic signals, generated by the transceiver device integrated therein, to the outside world, and thus allowing wireless two-way transmission.

The fact that the structure of the metal ring continues to shield at least partially the electromagnetic signals generated is even a further advantage since it does not allow propagation beyond a few centimeters, or in unwanted directions, and therefore reduces, and substantially cancels, the risk of possible interception or duplication of the radio signal.

A person skilled in the art may make changes and adaptations to the embodiments of the assembly described above or can replace elements with others which are functionally equivalent to satisfy contingent needs without departing from the scope of protection of the appended claims. All the features described above as belonging to a possible embodiment may be implemented independently of the other described embodiments.

The invention claimed is:

1. A ring or jewel assembly with radio frequency transceiver function, comprising:

a metal body of the ring or jewel;

a cavity in said body of the ring or jewel, filled, at least in part, by one or more portions including at least one dielectric material;

a radio frequency transceiver microelectronic device, configured to transmit and receive radio frequency signals, with a spectrum belonging to a predefined radio frequency range, said microelectronic device being fixed on the ring or jewel, at least partially inserted in said cavity, and at least partially surrounded by said at least one dielectric material, wherein said at least one dielectric material is interposed between the metal of the body of the ring or jewel and the radio frequency transceiver microelectronic device, to prevent the radio frequency transceiver microelectronic device from being in contact with the metal of the ring or jewel, and to form a space of dielectric material, adapted to allow propagation of electromagnetic signals having a spectrum in said radio frequency range, wherein said ring or jewel is a precious metal ring, comprising at least one stone or precious stone, on which the radio frequency transceiver microelectronic device is fixed, said stone being fixed on the body of the ring or jewel and being contained in said cavity in the body of the ring, to only partially fill the cavity, which remains partially filled only with air, forming an air chamber interposed between the radio frequency transceiver microelectronic device and the ring metal body, wherein said portions of dielectric material comprise two portions, a first portion formed by a first dielectric material, consisting of stone, and a second portion formed by a second dielectric material, consisting of air; or wherein said ring or jewel is a precious metal ring, containing two stone portions between which the radio frequency transceiver microelectronic device is fixed in an interlocking manner, said two stone portions being fixed on the body of the ring or jewel and being contained in said cavity in the ring body, wherein said two stone portions form the two portions of dielectric material, consisting of a single dielectric material, consisting of stone.

2. A ring or jewel assembly according to claim 1, wherein the size of said space of dielectric material and the dielectric properties of the dielectric material or of the dielectric materials used are adapted to cancel or significantly reduce a shielding effect of the radio frequency electromagnetic waves by the metal of the body of the ring or jewel, and therefore allow the propagation, in said space of dielectric material, of electromagnetic waves having a spectrum in said radio frequency range used, and allow the propagation, in the space surrounding the ring, of said radio frequency electromagnetic signals transmitted or to be received by the radio frequency transceiver microelectronic device.

3. A ring or jewel assembly according to claim 1, wherein the size of the space of dielectric material separating the radio frequency transceiver microelectronic device from the metal of the ring or jewel is in the range of 2 mm to 5 mm.

4. A ring or jewel assembly according to claim 1, wherein a relative dielectric constant of said at least one dielectric material separating the radio frequency transceiver microelectronic device from the metal of the ring or jewel is less than.

5. A ring or jewel assembly according to claim 1, wherein said radio frequency transceiver microelectronic device is a passive transponder or tag, operating at radio frequency.

6. A ring or jewel assembly according to claim 5, wherein said radio frequency transceiver microelectronic device is a passive RFID transponder or tag, operating at RF-ID radio frequency.

7. A ring or jewel assembly according to claim 5, wherein said passive transponder or tag is configured to interact with an external RF antenna, adapted to emit an activation signal, so that, when the ring or jewel assembly approaches said antenna below a predefined operating distance, the transponder or tag is activated after receiving the activation signal, and wherein the transponder or tag, once activated, is configured to emit one or more predefined radio frequency signals corresponding to one or more predefined commands.

8. A ring or jewel assembly according to claim 7, wherein said one or more commands or functions comprise:

opening and closing doors and a trunk of the automobile; and/or automatically adjusting driving settings of a driver, and/or starting and stopping an engine and/or changing engine power and/or switching on and setting air conditioning system, and/or switching on and managing an audio system.

9. A ring or jewel assembly according to claim 8, wherein said one or more commands or functions are performed when the ring or jewel assembly approaches a respective active RFID device placed close to handles, for opening and closing the doors and trunk of the automobile;

and/or when the ring or jewel assembly approaches a respective active RFID device placed inside a passenger compartment, for other commands or functions.

10. A ring or jewel assembly according to claim 7, wherein said predefined operating distance is of the order of one or more centimeters, so that commands and functions of the passive transponder or tag may be carried out only close to said external antenna or said active RFID device, and wherein the passive transponder or tag is configured to allow the propagation of the radio frequency electromagnetic signal in a limited space outside the ring or jewel assembly, of a size comparable to that of said predefined operating distance.

11. A ring or jewel assembly according to claim 1, wherein said microelectronic radio frequency transceiver device is configured to operate at LF or HF or UHF frequencies.

12. A ring or jewel assembly according to claim 1, wherein the metal body of the ring or jewel comprises a carved or engraved metal body forming the cavity, and/or wherein said stone comprises a carving or inner boring to allow passage of radio frequencies.

13. A ring or jewel assembly according to claim 1, wherein said precious metal is gold, or wherein said precious metal is platinum, or titanium, or silver.

14. A ring or jewel assembly with radio frequency transceiver function, comprising:

a metal body of the ring or jewel;

a cavity in said body of the ring or jewel, filled, at least in part, by one or more portions including at least one dielectric material;

a radio frequency transceiver microelectronic device, configured to transmit and receive radio frequency signals, with a spectrum belonging to a predefined radio frequency range, said microelectronic device being fixed on the ring or jewel, at least partially inserted in said cavity, and at least partially surrounded by said at least one dielectric material;

wherein said at least one dielectric material is interposed between the metal of the body of the ring or jewel and the radio frequency transceiver microelectronic device, to prevent the radio frequency transceiver microelectronic device from being in contact with the metal of the ring or jewel, and to form a space of dielectric material, adapted to allow propagation of electromagnetic signals having a spectrum in said radio frequency range;

wherein said radio frequency transceiver microelectronic device is a passive transponder or tag, operating at radio frequency;

wherein said passive transponder or tag is configured to interact with an external RF antenna, adapted to emit an activation signal, so that, when the ring or jewel assembly approaches said antenna below a predefined operating distance, the transponder or tag is activated after receiving the activation signal;

wherein the transponder or tag, once activated, is configured to emit one or more predefined radio frequency signals corresponding to one or more predefined commands; and wherein the transponder or tag is configured to perform functions of a remote control for an automobile, and is adapted to interoperate, to carry out one or more commands or functions, with one or more active RFID devices, arranged in respective positions within the automobile, each active RFID device comprising an RF antenna connected to a respective active reader.

15. A ring or jewel assembly with radio frequency transceiver function, comprising:

a metal body of the ring or jewel;

a cavity in said body of the ring or jewel, filled, at least in part, by one or more portions including at least one dielectric material;

a radio frequency transceiver microelectronic device, configured to transmit and receive radio frequency signals, with a spectrum belonging to a predefined radio frequency range, said microelectronic device being fixed on the ring or jewel, at least partially inserted in said cavity, and at least partially surrounded by said at least one dielectric material;

wherein said at least one dielectric material is interposed between the metal of the body of the ring or jewel and the radio frequency transceiver microelectronic device, to prevent the radio frequency transceiver microelectronic device from being in contact with the metal of the ring or jewel, and to form a space of dielectric material, adapted to allow propagation of electromagnetic signals having a spectrum in said radio frequency range;

wherein said radio frequency transceiver microelectronic device is a passive transponder or tag, operating at radio frequency;

wherein said passive transponder or tag is configured to interact with an external RF antenna, adapted to emit an activation signal, so that, when the ring or jewel assembly approaches said antenna below a predefined operating distance, the transponder or tag is activated after receiving the activation signal;

wherein the transponder or tag, once activated, is configured to emit one or more predefined radio frequency signals corresponding to one or more predefined commands; and wherein the transponder or tag is configured to perform contactless operation functions of a credit or prepaid card.

\* \* \* \* \*